United States Patent
Renault

(10) Patent No.: US 6,586,072 B1
(45) Date of Patent: Jul. 1, 2003

(54) ACOUSTICALLY EFFECTIVE INSULATING LINING FOR MOTOR VEHICLES

(75) Inventor: Eric Renault, Aubergenville (FR)

(73) Assignee: Rieter Automotive (International) AG, Zollikon (CH)

(*) Notice: Subject to any disclaimer, the term of this patent is extended or adjusted under 35 U.S.C. 154(b) by 0 days.

(21) Appl. No.: 09/700,389

(22) PCT Filed: May 22, 1999

(86) PCT No.: PCT/CH99/00223

§ 371 (c)(1),
(2), (4) Date: Nov. 14, 2000

(87) PCT Pub. No.: WO99/61284

PCT Pub. Date: Dec. 2, 1999

(30) Foreign Application Priority Data

May 22, 1998 (CH) .............................................. 1117/98

(51) Int. Cl.⁷ ................................................ B32B 3/12
(52) U.S. Cl. ...................... 428/116; 428/218; 428/220; 181/290; 156/71
(58) Field of Search ................................ 428/116, 220, 428/218; 181/290; 156/71

(56) References Cited

U.S. PATENT DOCUMENTS 6,158,771 A * 12/2000 Nusser et al. ............... 280/752

FOREIGN PATENT DOCUMENTS

| EP | 0 824 066 A1 | 2/1998 |
| GB | 1 353 468 | 5/1974 |
| GB | 1 373 063 | 6/1974 |
| GB | 2 314 526 A | 1/1998 |

* cited by examiner

Primary Examiner—Elizabeth M. Cole
(74) Attorney, Agent, or Firm—Nath & Associates PLLC; Gary M. Nath; Marvin C. Berkowitz

(57) ABSTRACT

An insulating lining that is used as a floor covering and is especially useful in providing acoustic insulation. The insulating lining consists of a covering layer and a cell layer with a plurality of cells. The cells are defined by lateral cell walls and are open on the bearing surface side. The cell walls of the cell layer have spacers on the bearing surface side so that when the insulating covering is in place air which is enclosed in each cell can communicate directly with the airspace in each adjacent cell through a lateral space between the bearing surface and the bottom edge of the cell wall between each pair of adjacent cells.

18 Claims, 2 Drawing Sheets

ACOUSTICALLY EFFECTIVE INSULATING LINING FOR MOTOR VEHICLES

Figure 1:
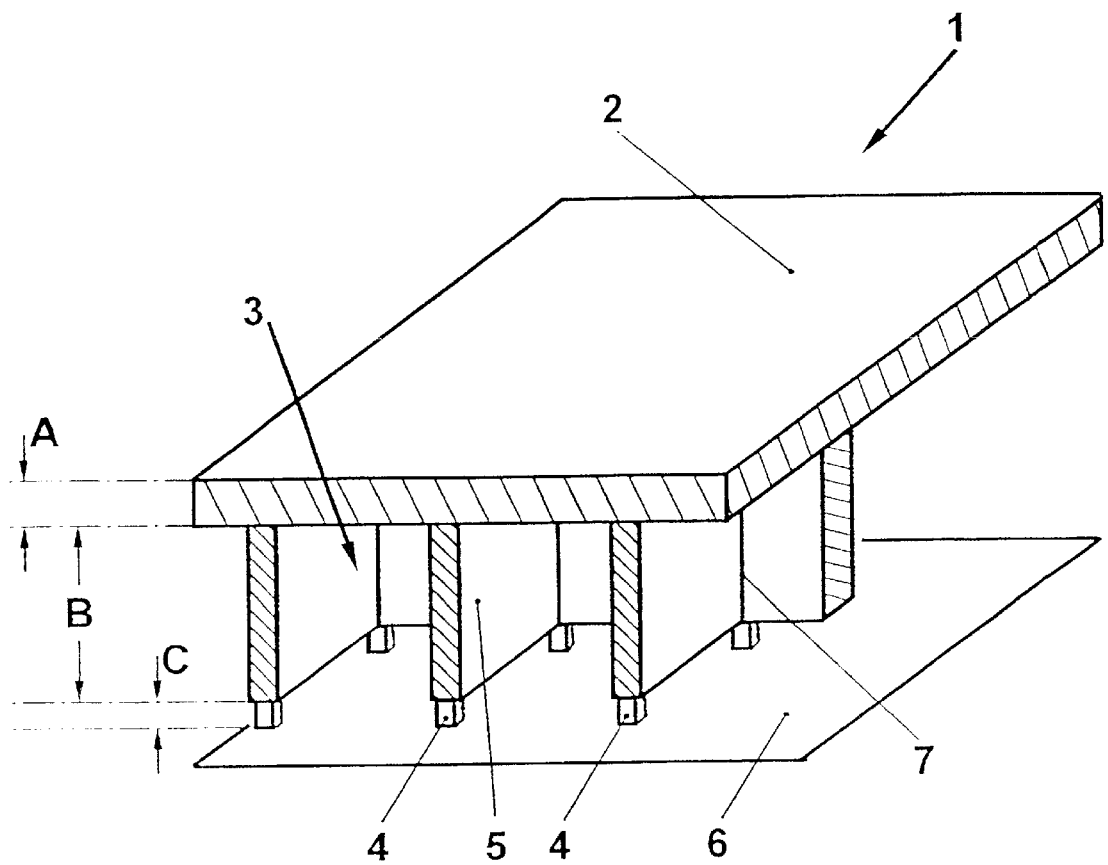

The present invention relates to an insulating covering, in particular a floor covering, for acoustic insulation of car body parts according to the precharacterising clause of claim 1.

Acoustically effective insulating coverings are used in vehicle construction, in particular in tractors and other commercial vehicles, in which floor panels, loading areas, luggage boots etc. are provided with insulating coverings, to reduce the level of noise emitted by these car body parts. Measures for reducing the noise emitted into the inside of the vehicle are of particular importance, since noise is known to cause subjective feelings of ill health, for example headaches, a pounding heart or elevated blood pressure. It is therefore the desire of the modern vehicle industry to reduce as far as possible the noise level in vehicles.

The known measures for reducing the noise level produced by vibration car body parts are currently limited substantially to two measures:
  a) rigidification and vibration damping of the car body parts in question by adhered or fused-on, bending resistant dissipatively acting damping layers;
  b) covering of the damped or bare car body parts with a so-called spring-mass system, i.e. a covering of porous resilient material (nonwoven or foam) with a heavy backing layer applied thereto. Such coverings are often provided inside the vehicle with a decorative or carpet layer.

In general, the spring layer consists of porous materials having the lowest possible modulus of elasticity and a filled PU foam is used for the mass layer or heavy backing layer. These acoustically insulating coverings consist of two or more layers of different materials, which makes the production and recycling of these coverings more difficult and expensive.

These insulating coverings are generally heat- and damp-sensitive, are not very robust and are not really suitable for use in open vehicles, for example agricultural vehicles, or in construction machines. Moreover, in the vehicle industry tight limits are set in relation to the amount of space which may be used in total for the insulating system and to the additional weight associated therewith.

It is therefore the object of the present invention to provide an acoustically insulating covering which does not exhibit the disadvantages of the known acoustic insulation systems.

In particular, it is the object of the present invention to provide an insulating covering which may be made of a single material and in a single forming process, so as to achieve lower cost manufacture than conventional acoustic insulation systems allow.

According to the invention, this object is achieved by an insulating covering having the features of claim 1. In particular, the nub of the invention is that the insulating covering comprises three different functional zones: a first zone (A) comprises a top layer which lends stability and non-crushability to the entire component and serves as mass layer for the spring-mass system according to the invention; a second zone (B) consisting of a plurality of open cells, the cell walls and enclosed air of which assume the function of a resilient spring for the spring-mass system; a third zone (C), which separates the second zone (B) and the cellular layer thereof by means of small spacer elements from a car body part to be insulated. The cross-sectional area of each of these spacer elements is substantially smaller than the cross-sectional area of the cell walls forming the cells. It goes without saying that the top layer may be provided on the upper side with a pattern and is made of abrasion-resistant material.

The present invention is additionally based on the knowledge that the sound-absorbing and sound-insulating action within the insulating covering may be improved substantially if the air flow in the zone (C), i.e. between the vibrating car body part and the cellular layer, undergoes frictional loss. To this end, only the smallest possible supporting elements are arranged in the third zone, hereinafter also known as the spacing zone, the cross-sectional area of said supporting elements being substantially smaller than the cross-sectional area of the cell walls. Thus, controllable lateral air flow resistance is produced in the third zone, which results in additional energy dissipation. The sound emission, here under consideration, in motor vehicles, railway vehicles or machines is produced by bending vibrations of the car body panels. When the car body parts vibrate, localised excess pressure is produced in the air above the upwardly vibrating areas thereof, while a partial vacuum is produced above the adjacent downwardly vibrating areas. Owing to the lateral air flow in the third zone, made possible by the invention, partial pressure equalisation is achieved between the areas of excess pressure and partial vacuum. This means that less pressure is built up in the air column above the upwardly vibrating areas and reduced acceleration is produced in the first zone of the insulating covering. The same also applies to the downwardly vibrating car body areas.

Further particularly advantageous developments of the insulating covering according to the invention are distinguished by the features of the subclaims.

In particular, a preferred embodiment of the cellular layer of the insulating covering comprises a plurality of cells with a square base of approximately 42×42 mm$^2$. In a further preferred embodiment, the spacer elements are arranged at the points of intersection of the cell walls and comprise a cross-sectional area of up to 5 mm$^2$ and a height of from 1 to 4 mm. The cell walls are of rubber or PU and exhibit a thickness of 2 mm and a height of up to 18 mm.

In a particular embodiment, at least one part of the cell walls between adjacent spacer elements comprises at least one recess. Thus, the lateral air flow resistance may be simply regulated or optimised. In a preferred embodiment, these recesses comprise a height (B') of up to 4 mm. The ratio of the width (D) of these recesses to the distance (E) between adjacent spacer elements is ratio 3:4.

In a particularly advantageous embodiment, all the zones, and in particular the entire insulating covering, are made of a single material and the desired physical properties are achieved by suitable shaping or dimensioning of the individual zones. In particular, the individual zones may exhibit different densities. Thus, the insulating covering according to the invention is distinguished not only by its good acoustic properties, its robustness and ease of recycling, but also by a particular cost-effective method of manufacture.

Thus, according to the invention, a weather-resistant insulating covering is provided which exhibits easily optimisable acoustic efficiency, in particular in the frequency ranges which are particularly disturbing in open vehicles, in relation to known acoustic insulation systems.

These properties may be achieved without the need for additional layers.

Many other embodiments lie within the normal technical competence of a person skilled in the art and will be obvious to the person skilled in the art from the teaching disclosed without the need for an inventive step.

Figure 2:
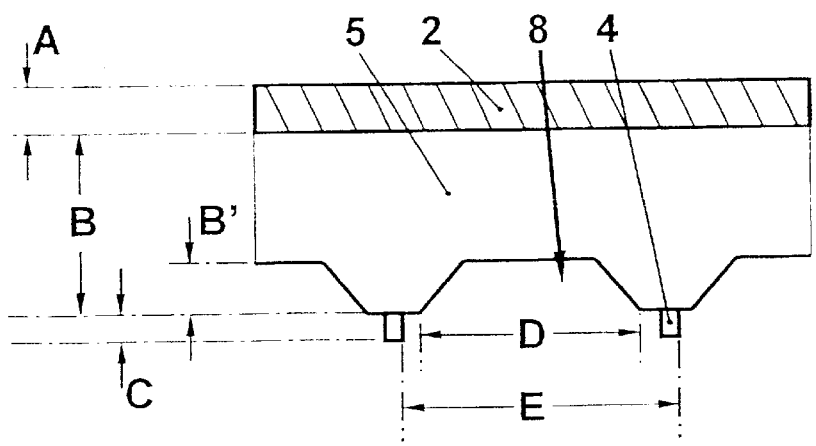
Figure 3:
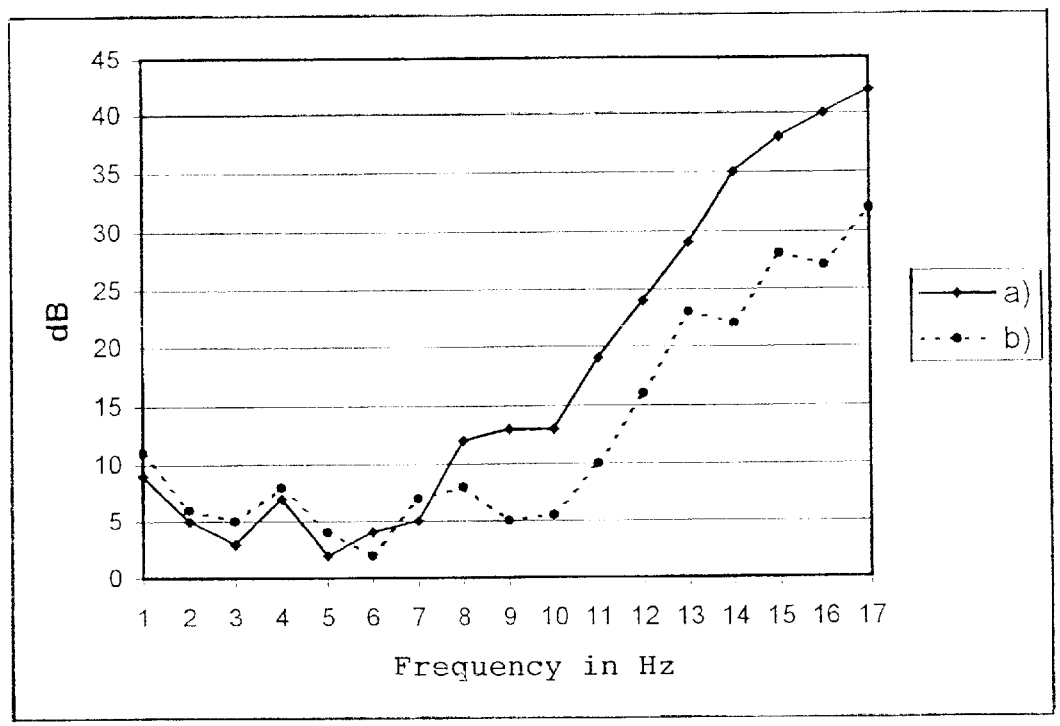

The invention is described in more detail with reference to the exemplary embodiments illustrated in the Figures, in which:

FIG. 1   is a perspective representation of the insulating covering according to the invention;
FIG. 2   shows a variant of the insulating covering according to the invention;
FIG. 3   is a representation of comparative measurements of the frequency dependent acoustic insulation effect.

The insulating covering 1 shown in FIG. 1 comprises three superposed zones A, B and C, each of which has particular acoustic effects and the combination of which results in a surprisingly good insulating effect.

The first zone A comprises a top layer 2, which acts essentially as a heavy backing layer. The second zone B comprises a cellular layer constructed from cells 3, the dissipative effect of which is ensured substantially by the viscoelastic cell walls 5. According to the invention, the third zone C comprises a plurality of knob-type supporting elements 4, which space the second zone B of the insulating covering 1 from the car body part 6. The spacing elements 4 have such small geometric dimensions in relation to the cell walls 5 forming the cells 3 that they allow lateral air flow along the bearing surface between car body part 6 and the insulating covering 1. This zone C on the one hand allows lateral pressure equalisation between areas of different pressure above the vibrating car body part and produces friction losses in the laterally flowing air.

In a preferred embodiment, the insulating covering 1 comprises the following geometric dimensions in the three zones A, B and C:

the top layer 2 is just a few millimeters thick and is conformed to the load-bearing capacity or friction loss and sound damping/insulation requirements to be achieved; zone B takes the form of cells, in the present Example, the cell walls 5 of which are approximately 2 mm thick and exhibit a height of 18 mm. The cross-sectional shape of the cells in this exemplary embodiment is square and has a unit dimension of 42 mm.

In the preferred exemplary embodiment, the shape of the spacer elements 4 is cylindrical, with a diameter of 2 mm. Each spacer element 4 is arranged at an intersection point 7 of the cell walls 5.

In a second embodiment, illustrated in FIG. 2, the cell walls 5 comprise recesses 8 between adjacent spacer elements 4, these recesses 8 having a height B' of 4 mm and a width D which constitutes approximately three quarters of the distance E between adjacent spacer elements. These recesses 8 mean that the insulating effect of the insulating covering 1 may be optimised in a simple, low-cost manner in accordance with the specific use to which it is to be put.

Although the embodiments shown have particular geometric dimensions and shapes, such as the cylindrical shape of the spacer elements 4 for example, other dimensions and shapes are also within the usual technical competence of a person skilled in the art.

It is particularly advantageous that the insulating covering 1 according to the invention may be made of a single material, which allows the achievement only of excellent acoustic properties but also of economically optimum manufacture. As is known to the person skilled in the art, nonwovens of natural and synthetic fibres or heavy foams, for example rubber or PU foam, are conventionally used to produce conventional insulating coverings. All such materials may be used for the insulating covering according to the invention. The particular choice of material is left to the discretion of the person skilled in the art, who will select a material matching his/her purpose from the range of materials known to him/her and dimension it appropriately. The weight per unit area of such insulating coverings is typically around 10 kg/m$^2$.

FIG. 3 shows by means of two measurement curves the effect achieved by the insulating covering according to the invention. The measurement curve b) illustrates the frequency-dependent profile of the insulating effect for a conventional insulation system, consisting of a top layer (A) with a cellular layer (B) arranged therebelow, the weight per unit area of which amounts to 8.2 kg/M$^2$. This measurement curve shows a typical profile for such insulation systems. In contrast, the curve a) shows the frequency-dependent behaviour of an insulating covering according to the invention, likewise of rubber but with a weight per unit area of 7.9 kg/m$^2$. This latter is thus lighter than the above-mentioned, conventional insulation system. Although both measurement curves exhibit roughly the same behaviour in the lower-frequency range, above 450 Hz the insulation provided by the insulating covering according to the invention is significantly better.

It goes without saying that the essence of the invention is not restricted to the embodiments illustrated. It is thus feasible, without going beyond the scope of the invention, to arrange more than one recess 8 between adjacent spacer elements 4 in a cell wall 5. Thus, for example, additional recesses 8 are possible on each side of a spacer element 4, with which recesses 8 the acoustic behaviour may be specifically influenced through modified spring action.

Furthermore, without going beyond the scope of the invention, the spacer elements 4 may be arranged on the cell walls 5 between the intersection points 7 thereof, which modifies vibration behaviour in the desired manner for particular applications. Adaptation of such a modification to desired vibration characteristics lies within the competence of the person skilled in the art. Naturally, the individual cells in the cellular layer 5 may be exhibit a different shape. In particular, they may also comprise triangular or polygonal cross-sectional areas or combinations thereof. The shape of the spacer elements may likewise be cylindrical, conical, spherical or angular. The dimensions of the cells and cell walls will be adapted appropriately by the person skilled in the art in accordance with the material used and his/her purpose.

In addition to the acoustic effects which may be achieved, the simple production method, with a single forming process, is particularly advantageous. In particular, the insulating covering according to the invention may be produced as a pressed or moulded article by compression moulding, diecasting or injection moulding. In a further development of the insulating covering according to the invention, the individual zones are compressed by different amounts during production. In this way, manufacture of the insulating element according to the invention may be simply adapted to particular requirements.

What is claimed is:

1. Insulating covering in the form of a spring-mass system for acoustic insulation of a vibrating part, which insulating covering comprises three different functional zones:

a first zone (A) comprises non-perforated top layer having an inner surface which lends stability and non-crushability to the entire insulating covering and serves as a mass layer for the spring-mass system;

a second zone (B) comprising a cellular layer having a plurality of open cells, each cell comprising:
   a plurality of lateral cell walls each having a top edge and a bottom edge, said top edge of each cell wall being connected to said inner surface;
   an air space enclosed by said cell walls and said top layer, whereby the cell walls and the air space enclosed thereby assume the function of a resilient spring for the spring-mass system; and
a third zone (C) comprising a plurality of spacer elements disposed on portions of said bottom edge of selected ones of said cell walls of said plurality of cells and extended below said bottom edge of each cell wall, said spacer elements being so positioned as to separate the second zone (B) and substantially an entire length of the bottom edge of each cell wall of the cellular layer thereof from a non-perforated bearing surface when the insulating covering is in place whereby air enclosed in each cell's airspace can communicate directly with the airspace in each adjacent cell in said cellular layer through a lateral space between the bearing surface and the bottom edge of the cell wall between each pair of adjacent cells.

2. Insulating covering according to claim 1, characterized in that the cells exhibit a base approximately 42×42 mm$^2$.

3. Insulating covering according to claim 1, characterized in that the spacer elements are arranged at points of intersection of the cell walls.

4. Insulating covering according to claim 1, characterized in that the spacer elements have a cross-sectional area of up to 5 mm$^2$ and a height of from 1 to 4 mm.

5. Insulating covering according to claim 1, characterized in that the cell walls exhibit a thickness of 2 mm and a height of up to 18 mm.

6. Insulating covering according to claim 1, characterized in that at least some of the cell walls between adjacent spacer elements further comprise at least one recess opening through said cell wall.

7. Insulating covering according to claim 6, characterized in that the recess opening exhibits a height of up to 4 mm, and the ratio of a width of the recess opening to a distance between adjacent spacer elements is 3:4.

8. Insulating covering according to claim 1, characterized in that the top layer, the cellular layer and the spacer elements are made from the same material.

9. Insulating covering according to claim 8, characterized in that the top layer, the cellular layer and/or the spacer elements exhibit different densities.

10. Insulating covering according to claim 1, wherein said vibrating part is a vehicle, machine or building.

11. Insulating covering according to claim 1, characterized in that said spring-mass system comprises a vehicle floor covering.

12. Insulating covering according to claim 1, characterized in that the bearing surface is a vehicle body part.

13. Insulating covering according to claim 1, characterized in that a cross-sectional area of said spacer elements is substantially less than a cross-sectional area of said cell walls.

14. A method of acoustically insulating a vibrating part having a non-perforated bearing surface, comprising:
   providing an insulating covering having a spring-mass system, comprising:
      a first zone having a non-perforated top layer having an inner surface which lends stability and non-crushability to the insulating covering and serves as a mass layer for the spring-mass system;
      a second zone comprising a cellular layer having a plurality of open cells, each cell comprising:
         a plurality of lateral cell walls each having a top edge and a bottom edge, said top edge of each cell wall being connected to said inner surface;
         an air space enclosed by said cell walls and said top layer, whereby the cell walls and the air space enclosed thereby assume the function of a resilient spring for the spring-mass system; and
      a third zone comprising a plurality of spacer elements disposed on portions of said bottom edge of selected ones of said cell walls of said plurality of cells and extended below said bottom edge of each cell wall;
   positioning said insulating covering on the bearing surface such that said spacer elements separate the second zone and substantially an entire length of the bottom edge of each cell wall of the cellular layer thereof from the bearing surface whereby air enclosed in each cell's airspace can communicate directly with the airspace in each adjacent cell in said cellular layer through a lateral space between the bearing surface and the bottom edge of the cell wall between each pair of adjacent cells.

15. Method according to claim 14, further comprising regulating a lateral flow of air between ones of said cells by providing recess openings through selected ones of said cell walls.

16. Method according to claim 14, wherein said vibrating part is a vehicle, a machine or a building.

17. Method according to claim 14, characterized in that said insulating covering comprises a vehicle floor covering.

18. Method according to claim 14, characterized in that the bearing surface is a vehicle body part.

* * * * *